(12) United States Patent
Araki et al.

(10) Patent No.: US 11,949,353 B2
(45) Date of Patent: Apr. 2, 2024

(54) MOTOR CONTROL DEVICE

(71) Applicant: SANDEN CORPORATION, Isesaki (JP)

(72) Inventors: Yushi Araki, Isesaki (JP); Tatsuki Kashihara, Isesaki (JP)

(73) Assignee: SANDEN CORPORATION, Isesaki (JP)

(*) Notice: Subject to any disclaimer, the term of this patent is extended or adjusted under 35 U.S.C. 154(b) by 127 days.

(21) Appl. No.: 17/801,013

(22) PCT Filed: Feb. 19, 2021

(86) PCT No.: PCT/JP2021/006364
§ 371 (c)(1),
(2) Date: Aug. 19, 2022

(87) PCT Pub. No.: WO2021/172207
PCT Pub. Date: Sep. 2, 2021

(65) Prior Publication Data
US 2023/0101356 A1 Mar. 30, 2023

(30) Foreign Application Priority Data
Feb. 28, 2020 (JP) ................ 2020-032772

(51) Int. Cl.
*H02P 21/05* (2006.01)
*H02P 21/14* (2016.01)
(Continued)

(52) U.S. Cl.
CPC ............. *H02P 21/05* (2013.01); *H02P 21/14* (2013.01); *H02P 21/22* (2016.02); *H02P 21/26* (2016.02); *H02P 25/024* (2016.02); *H02P 27/085* (2013.01)

(58) Field of Classification Search
CPC .......... H02P 21/05; H02P 21/14; H02P 21/22; H02P 21/26; H02P 25/024; H02P 27/085; H02P 6/10; H02P 21/18
(Continued)

(56) References Cited

U.S. PATENT DOCUMENTS 7,034,493 B2 * 4/2006 Yoshimoto ............. H02P 21/06
363/39

FOREIGN PATENT DOCUMENTS

JP 4019842 B2 12/2007
JP 2009-017676 A 1/2009
(Continued)

OTHER PUBLICATIONS

International Search Report dated Apr. 27, 2021 for International Application No. PCT/JP2021/006364.

*Primary Examiner* — David Luo
(74) *Attorney, Agent, or Firm* — Baker Botts L.L.P.

(57) ABSTRACT

There is provided a motor control device which enables torque ripple suppressing control high in followability by executing direct voltage control. A motor control device includes a voltage command calculation unit 15 which calculates a d-axis voltage command value $V_d^{ref}$ and a q-axis voltage command value $V_q^{ref}$ from a d-axis current command value $i_d^*$ and a q-axis current command value $i_q^*$ of a motor 6, a feed forward command value calculation unit 23 which calculates a qi-axis voltage feed forward command value $V^{aff*}$ for generating a q-axis current ripple on the basis of spatial harmonic parameters and the frequency characteristics of a motor winding, and a subtraction unit 10 which subtracts the q-axis voltage feed forward command value $V_{qff}^*$ calculated by the feed forward command value calculation unit 23 from the q-axis voltage command value $V_q^{ref}$ calculated by the voltage command calculation unit 15.

10 Claims, 7 Drawing Sheets

(51) Int. Cl.
*H02P 21/22* (2016.01)
*H02P 21/26* (2016.01)
*H02P 25/024* (2016.01)
*H02P 27/08* (2006.01)

(58) Field of Classification Search
USPC .............................. 318/400.23, 400.01, 700
See application file for complete search history.

(56) References Cited

FOREIGN PATENT DOCUMENTS

| | | |
|---|---|---|
| JP | 5262267 B2 | 8/2013 |
| JP | 2017-139926 A | 8/2017 |
| JP | 2018-191450 A | 11/2018 |

\* cited by examiner

| Sampling frequency $f_s$ [kHz] | 20 |
|---|---|
| Speed control band $\omega_s$ [rad/s] | 94 |
| Current control band $\omega_c$ [rad/s] | 1256 |

|  | Amplitude [Nm] | Improvement rate [%] |
|---|---|---|
| Conventional method | 0.59 |  |
| q-axis voltage feed forward | 0.14 | 76.3 |
| dq-axis voltage feed forward | 0.10 | 83.1 |

MOTOR CONTROL DEVICE

CROSS-REFERENCE TO RELATED APPLICATIONS

This application is a U.S. National Stage Patent Application under 37 U.S.C. § 371 of International Patent Application No. PCT/JP2021/006364, filed on Feb. 19, 2021, which claims the benefit of Japanese Patent Application No. JP 2020-032772, filed on Feb. 28, 2020, the disclosures of each of which are incorporated herein by reference in their entirety.

TECHNICAL FIELD

The present invention relates to a control device for a motor.

BACKGROUND ART

Electric compressors powered by inverter motors have been used as compressors used in air conditioners for electric vehicles such as hybrid vehicles and electric vehicles. Since electric compressors used in vehicles need to be miniaturized, the proportion of spatial harmonic distortion tends to increase. Since the spatial harmonic causes current ripples which lead to electromagnetic noise, torque ripples, and electromagnetic noise due to the excitation force in the radial direction, the number of filters and vibration suppression components increases, which hinders miniaturization.

On the other hand, in general, since it is difficult to attach an encoder to an electric compressor due to mechanical constraints, position sensorless vector control is used. In this position sensorless vector control, it is difficult to raise a current control band due to a problem in a control configuration. That is, it is not easy to control high-frequency spatial harmonic distortion with respect to the control band.

For example, in Patent Document 1, a torque ripple is suppressed by fluctuating a torque command value of a motor current at a high frequency using information on spatial harmonics. Further, in Patent Document 2, the difference between the detected harmonic components of motor current and their command values is calculated, and a harmonic voltage command value is output by feedback control. This is added to a three-phase voltage command value, thereby reducing the torque ripple of a motor.

CITATION LIST

Patent Documents

Patent Document 1: Japanese Patent No. 5262267
Patent Document 2: Japanese Patent No. 4019842

SUMMARY OF THE INVENTION

Problems to be Solved by the Invention

However, in Patent Document 1, it is necessary to set a current control system to a band sufficiently high with respect to the revolution speed of the motor, and the band of the current control system becomes too high for one driven at a high revolution speed as in an electric compressor. In Patent Document 2, in consideration of it, feedback control is performed in which the responsiveness of only the harmonic characteristics is enhanced, but the phase characteristics of a detected actual current are PI-controlled as they are.

However, since there is actually a phase difference between the current and voltage to be controlled, it is necessary to perform voltage control in consideration of the phase difference. Therefore, in Patent Document 2, the feedback control band is lowered so that a PI-dhqh current controller does not work unstable, and the result is converged over time. That is, it is necessary to slow down the responsiveness, and as a result, it takes time for the effect of reduction control of torque ripples or the like to appear, and there is also a problem that it does not converge in some cases.

The present invention has been made to solve the above-mentioned conventional technical problems, and an object of the present invention is to provide a motor control device capable of torque ripple suppressing control high in followability by directly performing voltage control.

Means for Solving the Problems

A motor control device of the present invention includes a voltage command calculation unit to calculate a d-axis voltage command value $V_d^{ref}$ and a q-axis voltage command value $V_q^{ref}$ from a d-axis current command value $i_d^*$ and a q-axis current command value $i_q^*$ of a motor, a feed forward command value calculation unit to calculate a q-axis voltage feed forward command value $V_{qff}^*$ for generating a q-axis current ripple on the basis of spatial harmonic parameters and the frequency characteristics of a motor winding, and a subtraction unit to subtract the q-axis voltage feed forward command value $V_{qff}^*$ calculated by the feed forward command value calculation unit from the q-axis voltage command value $V_q^{ref}$ calculated by the voltage command calculation unit, and is characterized by compensating for a torque ripple caused by spatial harmonics.

The motor control device of the invention of claim 2 is characterized in that in the above invention, the motor is a three-phase permanent magnet synchronous motor, and the feed forward command value calculation unit calculates the q-axis voltage feed forward command value $V_{qff}^*$ of electrical angle 6nth order (n is a positive integer).

The motor control device of the invention of claim 3 is characterized in that in the above respective invention, the feed forward command value calculation unit calculates the q-axis voltage feed forward command value $V_{qff}^*$ from a spatial harmonic value obtained by advancing the phase based on the impedance of the motor with respect to an electrical angle estimated value.

The motor control device of the invention of claim 4 is characterized in that in the above respective inventions, the feed forward command value calculation unit calculates the q-axis voltage feed forward command value $V_{qff}^*$ by multiplying the spatial harmonic by a gain based on the impedance of the motor.

The motor control device of the invention of claim 5 is characterized in that in the above respective inventions, the motor is a three-phase permanent magnet synchronous motor, and in that when a q-axis current estimated value of the motor is $\hat{i}_q$, a q-axis 6th order harmonic magnetic flux is $k_{6hq}$, an electrical angle estimated value is $\hat{\theta}_{re}$, the amplitude of an armature interlinkage magnetic flux 1st order component is $\phi_f$, a wiring resistance is R, a q-axis winding inductance is $L_q$, and an electric angular velocity is $\omega_{re}$, the q-axis voltage feed forward command value $V_{qff}^*$ is given as follows:

[Math. 1]

$$V_{aff}\mathrel{*}= \frac{i_q{}^{\wedge}k_{6hq}\left(6\theta_{re}{}^{\wedge}+\tan^{-1}\frac{6\omega_{re}L_q}{R}\right)}{\phi_f}\sqrt{R^2+(6\omega_{re}L_q)^2}, \quad (3)$$

and the feed forward command value calculation unit calculates the q-axis voltage feed forward command value $V_{aff}^*$ of the electrical angle 6th order by using the above equation (3).

The motor control device of the invention of claim 6 is characterized in that in the above respective inventions, the feed forward command value calculation unit further calculates a d-axis voltage feed forward command value $V_{dff}^*$ which is a coupling term in which the q-axis current ripple generated by the q-axis voltage feed forward command value $V_{qff}^*$ couples with the d-axis, and the motor control device further includes an addition unit to add the d-axis voltage feed forward command value $V_{dff}^*$ calculated by the feed forward command value calculation unit to the d-axis voltage command value $V_d^{ref}$ calculated by the voltage command calculation unit.

The motor control device of the invention of claim 7 is characterized in that in the above invention, the motor is a three-phase permanent magnet synchronous motor and in that when a q-axis current estimated value of the motor is $i_q$ (hat), a q-axis 6th order harmonic magnetic flux is $k_{6hq}$, an electrical angle estimated value is $\theta_{re}$ (hat), the amplitude of an armature interlinkage magnetic flux 1st order component is $\phi_f$, a q-axis winding inductance is $L_q$, and an electric angular velocity is $\omega_{re}$, the d-axis voltage feed forward command value $V_{dff}^*$ is given as follows:

[Math. 2]

$$V_{dff}\mathrel{*}=\frac{i_q{}^{\wedge}k_{6hq}(6\theta_{re}{}^{\wedge})}{\phi_f}L_q\omega_{re}, \quad (4)$$

and the feed forward command value calculation unit calculates the d-axis voltage feed forward command value $V_{dff}^*$ of the electrical angle 6th order by using the above equation (4).

The motor control device of the invention of claim 8 is characterized in that in the invention of claim 6 or 7, the motor is a three-phase permanent magnet synchronous motor, and the motor control device includes an inverter circuit to drive the motor, a phase voltage command calculation unit to convert a q-axis voltage command value $V_q^*$ after the q-axis voltage feed forward command value $V_{qff}^*$ is subtracted from the q-axis voltage command value $V_q^{ref}$, and a d-axis voltage command value $V_d^*$ after the d-axis voltage feed forward command value $V_{dff}^*$ is added to the d-axis voltage command value $V_d^{ref}$ into a three-phase modulated voltage command value, and a PWM signal generator to generate a PWM signal to PWM-control the inverter circuit on the basis of the three-phase modulated voltage command value.

Advantageous Effect of the Invention

A motor control device of the present invention includes a voltage command calculation unit to calculate a d-axis voltage command value $V_d^{ref}$ and a q-axis voltage command value $V_q^{ref}$ from a d-axis current command value $i_d^*$ and a q-axis current command value $i_q^*$ of a motor, a feed forward command value calculation unit to calculate a q-axis voltage feed forward command value $V_{qff}^*$ for generating a q-axis current ripple on the basis of spatial harmonic parameters and the frequency characteristics of a motor winding, and a subtraction unit to subtract the q-axis voltage feed forward command value $V_{qff}^*$ calculated by the feed forward command value calculation unit from the q-axis voltage command value $V_q^{ref}$ calculated by the voltage command calculation unit, and compensates for a torque ripple caused by spatial harmonics.

The q-axis voltage feed forward command value $V_{qff}^*$ calculated by the feed forward command value calculation unit is a voltage command value for generating a torque ripple due to spatial harmonics. In the present invention, this is directly subtracted from the q-axis voltage command value $V_q^{ref}$ in the subtraction unit. That is, according to the present invention, the voltage feed forward control related thereto makes it possible to cancel or suppress the torque ripple without being limited by the current control band. Consequently, the vibration of electromagnetic energy due to spatial harmonics can be eliminated or suppressed, so that electromagnetic noise and electromagnetic sound noise can be reduced.

In particular, when the motor is a three-phase permanent magnet synchronous motor, the spatial harmonics are excited at an electrical angle 6nth order, which is a multiple of 6. Therefore, if the feed forward command value calculation unit calculates the q-axis voltage feed forward command value $V_{qff}^*$ of the electrical angle 6nth order (n is a positive integer) as in the invention of claim 2, it is possible to effectively reduce the torque ripple.

Here, the current is delayed in phase with respect to the voltage based on the impedance of the motor. This lag phase changes depending on the driving conditions of the motor, and the lag phase of the motor impedance differs depending on the frequency. Hence, it is necessary to change the lag phase for each frequency. Therefore, as in the invention of claim 3, if the feed forward command value calculation unit calculates the q-axis voltage feed forward command value $V_{qff}^*$ from the spatial harmonic value obtained by advancing the phase based on the impedance of the motor with respect to the electrical angle estimated value, compensation in the voltage dimension can be performed without any trouble.

Further, since the frequency of the spatial harmonic changes depending on the driving conditions of the motor and an attenuation coefficient differs depending on the frequency as with the delayed phase, it is necessary to change the amplitude of the q-axis voltage feed forward command value $V_{qff}^*$ for each frequency. Therefore, if the feed forward command value calculation unit calculates the q-axis voltage feed forward command value $V_{qff}^*$ by multiplying the spatial harmonic by the gain based on the impedance of the motor as in the invention of claim 4, it becomes possible to appropriately compensate for the torque ripple of the spatial harmonic according to the driving conditions of the motor.

Here, when the motor is a three-phase permanent magnet synchronous motor, the electrical angle 6th order becomes the main component of the spatial harmonic torque ripple. Therefore, for example, as in the invention of claim 5, if the feed forward command value calculation unit calculates the cl-axis voltage feed forward command value $V_{qff}^*$ of the electrical angle 6th order by using the above equation (3), it becomes possible to effectively reduce the torque ripple.

Further, a phenomenon called a velocity electromotive force which couples with each other between dq axes exists in the motor. As in the above invention, when the q-axis voltage feed forward command value $V_{qff}^*$ is subtracted from the q-axis voltage command value $V_q^{ref}$ to generate the q-axis current ripple, the q-axis current ripple couples with the d-axis and hence the ripple is excited by a d-axis current and the ripple is excited by a reluctance torque.

Therefore, as in the invention of claim 6, the feed forward command value calculation unit further calculates a d-axis voltage feed forward command value $V_{dff}^*$ which is a coupling term in which the q-axis current ripple generated by the q-axis voltage feed forward command value $V_q^*$ couples with the d-axis. An addition unit to add the d-axis voltage feed forward command value $V_{dff}^*$ calculated by the feed forward command value calculation unit to the d-axis voltage command value $V_d^{ref}$ calculated by the voltage command calculation unit is further provided. Consequently, it becomes possible to suppress the excitation of the reluctance torque by subtracting the q-axis voltage feed forward command value $V_{qff}^*$.

Specifically, as in the invention of claim 7, the feed forward command value calculation unit calculates the d-axis voltage feed forward command value $V_{dff}^*$ of the electrical angle 6th order by using the equation (4). Consequently, it becomes possible to effectively suppress the excitation of the reluctance torque by subtracting the q-axis voltage feed forward command value $V_{qff}^*$ of the electrical angle 6th order.

Incidentally, in fact, as in the invention of claim 8, in each of the above inventions, an inverter circuit to drive the three-phase permanent magnet synchronous motor, a phase voltage command calculation unit to convert a q-axis voltage command value $V_q^*$ after the q-axis voltage feed forward command value $V_{qff}^*$ is subtracted from the q-axis voltage command value $V_q^{ref}$, and a d-axis voltage command value $V_d^*$ after the d-axis voltage feed forward command value $V_{dff}^*$ is added to the d-axis voltage command value $V_d^{ref}$ into a three-phase modulated voltage command value, and a PWM signal generator to generate a PWM signal to PWM-control the inverter circuit on the basis of the three-phase modulated voltage command value are further provided to constitute the motor control device. Consequently, it becomes possible to provide a motor control device in which electromagnetic noise and electromagnetic sound noise are extremely effectively reduced.

MODE FOR CARRYING OUT THE INVENTION

Hereinafter, embodiments of the present invention will be described in detail with reference to the drawings.

(1) Motor Control Device 1

Figure 1:
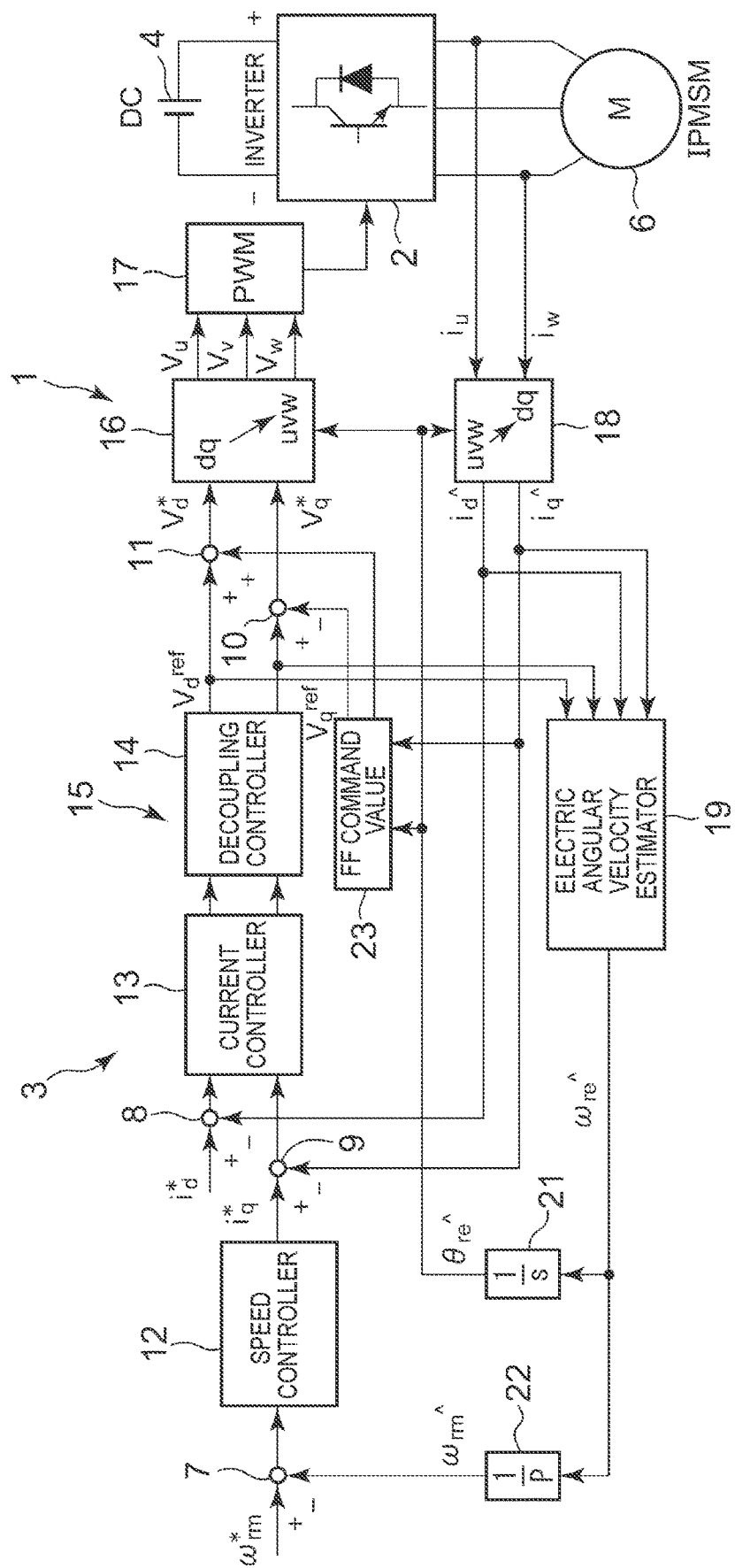
FIG. 1 is a system block diagram of a motor control device of an embodiment to which the present invention is applied.

FIG. 1 is a system block diagram of a motor control device 1 according to an embodiment of the present invention. The motor control device 1 of this embodiment includes an inverter circuit 2 and a control section 3 and is configured to convert DC power supplied from a DC power supply 4 such as an in-vehicle battery into AC power having a predetermined frequency and supply the same to a motor 6. The motor 6 of the embodiment is a three-phase interior permanent magnet synchronous motor (IPMSM) which drives an electric compressor used in an air conditioning device of an electric vehicle such as an electric automobile or a hybrid vehicle, and is driven by a voltage command generated by the control section 3.

(2) Inverter Circuit 2

The inverter circuit 2 is configured so that an input node is connected to the DC power supply 4, and the output of the DC power supply 4 is switched to convert it into a three-phase AC voltage, which is then supplied to the motor (IPMSM) 6. The inverter circuit 2 of the embodiment is configured by bridge-connecting a plurality of (six) switching elements.

(3) Control Section 3

The control section 3 generates a d-axis voltage command value $V_d^*$ and a q-axis voltage command value $V_q^*$ on the basis of the deviation between a mechanical angular velocity estimated value $\omega_{rm}$ (hat) of the motor 6 and a mechanical angular velocity command value $\omega_{rm*}$ thereof, generates a PWM signal for finally switching each switching element of the inverter circuit 2 from these d-axis voltage command value $V_d^*$ and q-axis voltage command value $V_q^*$, and drives the motor 6 by position sensorless vector control.

The control section 3 of the embodiment is constituted of subtraction units 7 to 10, an addition unit 11, a speed controller 12, a current controller 13, a decoupling controller 14, a phase voltage command calculation unit 16, a PWM signal generator 17, an uvw-dq converter 18, an electric angular velocity estimator 19, an integrator 21, an electrical angle-mechanical angle converter 22, and a feed forward command value calculation unit 23 which becomes the gist of the present invention.

The uvw-dq converter 18 of the embodiment is input with a U-phase current $i_u$ and a W-phase current $i_w$ of the motor 6 to calculate a V-phase current $i_v$ from these. The uvw-dq converter 18 is further input with an electrical angle estimated value $\theta_{re}$ (hat) output by the integrator 21 to derive a d-axis current estimated value $i_d$ (hat) and a q-axis current estimated value $i_q$ (hat) from the U-phase current $i_u$, the V-phase current $i_v$, the W-phase current $i_w$, and the electrical angle estimated value $\theta_{re}$ (hat).

The electric angular velocity estimator 19 derives and outputs an electric angular velocity estimated value $\omega_{re}$ (hat) from the d-axis current estimated value $i_d$ (hat) and the q-axis current estimated value $i_q$ (hat) output by the uvw-dq converter 18, and a d-axis voltage command value $V_d^{ref}$ and a q-axis voltage command value $V_q^{ref}$ output by the decoupling controller 14. The integrator 21 is input with the electric angular velocity estimated value $\omega_{re}$ (hat) to generate and output an electrical angle estimated value $\theta_{re}$ (hat) from the electric angular velocity estimated value $\omega_{re}$ (hat).

The electric angular velocity estimated value $\omega_{re}$ (hat) output by the electric angular velocity estimator 19 is further input to the electrical angle-mechanical angle converter 22. The electrical angle-mechanical angle converter 22 converts the electric angular velocity estimated value $\omega_{re}$ (hat) to a mechanical angular velocity estimated value $\omega_{rm}$ (hat) and outputs the same. This mechanical angular velocity estimated value $\omega_{rm}$ (hat) is input to the subtraction unit 7. The subtraction unit 7 is further input with the mechanical angular velocity command value $\omega_{rm}^*$. In the subtraction unit 7, the mechanical angular velocity estimated value $\omega_{rm}$ (hat) is subtracted from the mechanical angular velocity command value $\omega_{rm}^*$ to calculate their deviation.

The deviation calculated by the subtraction unit 7 is input to the speed controller 12. The speed controller 12 calculates a q-axis current command value $i_q^*$ by PI calculation and a relational expression between a q-axis current and torque. The subtraction unit 9 is input with the q-axis current command value $i_q^*$ calculated by the speed controller 12 and the q-axis current estimated value $i_1$ (hat) calculated by the uvw-dq converter 18 to subtract the q-axis current estimated value $i_q$ (hat) from the q-axis current command value $i_q^*$ so as to calculate their deviation.

On the other hand, the subtraction unit 8 is input with a d-axis current command value $i_d^*$ and a d-axis current estimated value $i_d$ (hat) calculated by the uvw-dq converter 18 to subtract the d-axis current estimated value $i_d$ (hat) from the d-axis current command value $i_d^*$ so as to calculate their deviation.

Here, the above-mentioned current controller 13 and decoupling controller 14 constitute a voltage command calculation unit 15 in the present invention. The voltage command calculation unit 15 performs PI calculation by the current controller 13 using the respective deviations output by the subtraction units 8 and 9 and cancels the coupling between the dg axes by the decoupling controller 14 to generate and output the d-axis voltage command value $V_d^{ref}$ and the q-axis voltage command value $V_q^{ref}$. Incidentally, the decoupling controller 14 realizes decoupling control by adding the generated voltage (coupling voltage) of the motor 6 to the command value in advance. In the voltage command calculation unit 15, basically, the d-axis voltage command value $V_d^{ref}$ and the q-axis voltage command value $V_q^{ref}$ in the direction of eliminating the deviation between the d-axis current command value $i_d^*$ and the d-axis current estimated value $i_d$ (hat), and the deviation between the q-axis current command value $i_q^*$ and the q-axis current estimated value $i_q$ (hat) are calculated.

The d-axis voltage command value $V_d^{ref}$ calculated by the voltage command calculation unit 15 is input to the addition unit 11. The addition unit 11 is further input with a d-axis voltage feed forward command value $V_{dff}^*$ output by the feed forward command value calculation unit 23 to add the d-axis voltage feed forward command value $V_{dff}^*$ to the d-axis voltage command value $V_d^{ref}$ so as to be output as a d-axis voltage command value $V_d^*$ after compensation ($V_d^* = V_d^{ref} + V_{dff}^*$).

Further, the q-axis voltage command value $V_q^{ref}$ calculated by the voltage command calculation unit 15 is input to the subtraction unit 10. The subtraction unit 10 is further input with a q-axis voltage feed forward command value $V_{qff}^*$ output by the feed forward command value calculation unit 23 to subtract the q-axis voltage feed forward command value $V_{qff}^*$ from the q-axis voltage command value $V_q^{ref}$ so as to be output as a q-axis voltage command value $V_q^*$ after compensation ($V_q^* = V_q^{ref} - V_{qff}^*$). Incidentally, the operation of the feed forward command value calculation unit 23 described above will be described in detail later.

The phase voltage command calculation unit 16 is input with these compensated d-axis voltage command value $V_d^*$ and q-axis voltage command value $V_q^*$ and the electrical angle estimated value $\theta_{re}$ (hat) output by the integrator 21. Then, the phase voltage command calculation unit 16 converts the d-axis voltage command value $V_d^*$ and the q-axis voltage command value $V_q^*$ into a U-phase voltage command value $V_u$, a V-phase voltage command value $V_v$, and a W-phase voltage command value $V_w$, which are three-phase modulated voltage command values. The PWM signal generator 17 generates a PWM signal for switching (PWM controlling) each switching element of the inverter circuit from these U-phase voltage command value $V_u$, V-phase voltage command value $V_v$, and W-phase voltage command value $V_w$. This realizes position sensorless vector control of the motor 6.

(4) Operation of Feed Forward Command Value Calculation Unit 23

Next, the operation of the feed forward command value calculation unit 23 of the control section 3 will be described. The motor control device 1 of the present invention suppresses harmonic electromagnetic distortion by the position sensorless vector control to reduce a torque ripple. Then, it operates so as to excite an anti-phase torque ripple at the same frequency as a ripple component in order to suppress this torque ripple.

(4-1) q-Axis Voltage Feed Forward Control

First, description will be made about the q-axis voltage feed forward control executed by the feed forward command value calculation unit 23. Firstly, the torque equation of the motor (IPMSM) 6 of the embodiment is shown in an equation (1).

[Math. 3]

$$T_m = P\phi_f i_q + P(L_d - L_q)i_d i_q + Pi_q k_{hq} + Pi_d k_{hd} \quad (1)$$

where $T_m$ is a motor torque [Nm], P is the number of pole pairs, $\phi_f$ is the amplitude of an armature interlinkage magnetic flux 1st order component [Wb], $k_{hd}$ is a d-axis harmonic magnetic flux [Wb], $k_{hq}$ is a q-axis harmonic magnetic flux [Wb], $i_d$ is a d-axis current [A], $i_q$ is a q-axis current [A], $L_d$ is a d-axis winding inductance [H], and $L_q$ is a q-axis winding inductance [H].

In the above equation (1), the first term is a magnet torque, the second term is a reluctance torque, the third term is a torque ripple caused by the q-axis current and a spatial harmonic, and the fourth term is a torque ripple caused by the d-axis current and a spatial harmonic. The spatial harmonics of the magnetic flux $k_{hd}$ and $k_{hq}$ are expressed by an equation (2). Incidentally, the equation (2) is an equation expressing the spatial harmonic components of the magnetic flux. Since the spatial harmonic in the motor (IPMSM) 6 has multiple order components of 6, the sixth order and the twelfth order are extracted and represented in the equation (2).

[Math. 4]

$$\begin{bmatrix} k_{hd} \\ k_{hq} \end{bmatrix} = \begin{bmatrix} k_{6hd} + k_{12hd} \\ k_{6hq} + k_{12hq} \end{bmatrix} \quad (2)$$

$$= \begin{bmatrix} (-5\psi_{s5} - 7\psi_{s7})\sin 6\theta_{re} + (5\psi_{c5} + 7\psi_{c7})\cos 6\theta_{re} \\ (-5\psi_{c5} - 7\psi_{c7})\sin 6\theta_{re} + (-5\psi_{s5} + 7\psi_{s7})\cos 6\theta_{re} \end{bmatrix}$$

$$+ \begin{bmatrix} (-11\psi_{s11} - 13\psi_{s13})\sin 12\theta_{re} + (11\psi_{c11} + 13\psi_{c13})\cos 12\theta_{re} \\ (-11\psi_{c11} - 13\psi_{c13})\sin 12\theta_{re} + (11\psi_{s11} + 13\psi_{s13})\cos 12\theta_{re} \end{bmatrix}$$

where $k_{6hd}$ is a d-axis 6th order harmonic magnetic flux [Wb], $k_{6hq}$ is a q-axis 6th order harmonic magnetic flux [Wb], $k_{12hd}$ is a d-axis 12th order harmonic magnetic flux [Wb], $k_{12hq}$ is a q-axis 12th harmonic magnetic flux [Wb], $\varphi_{sn}$ is a sine component of an nth order harmonic [Wb], $\varphi_{cn}$ is a cosine component of an nth order harmonic [Wb], and $\theta_{re}$ is an electrical angle [rad/s].

Figures 2, 3:
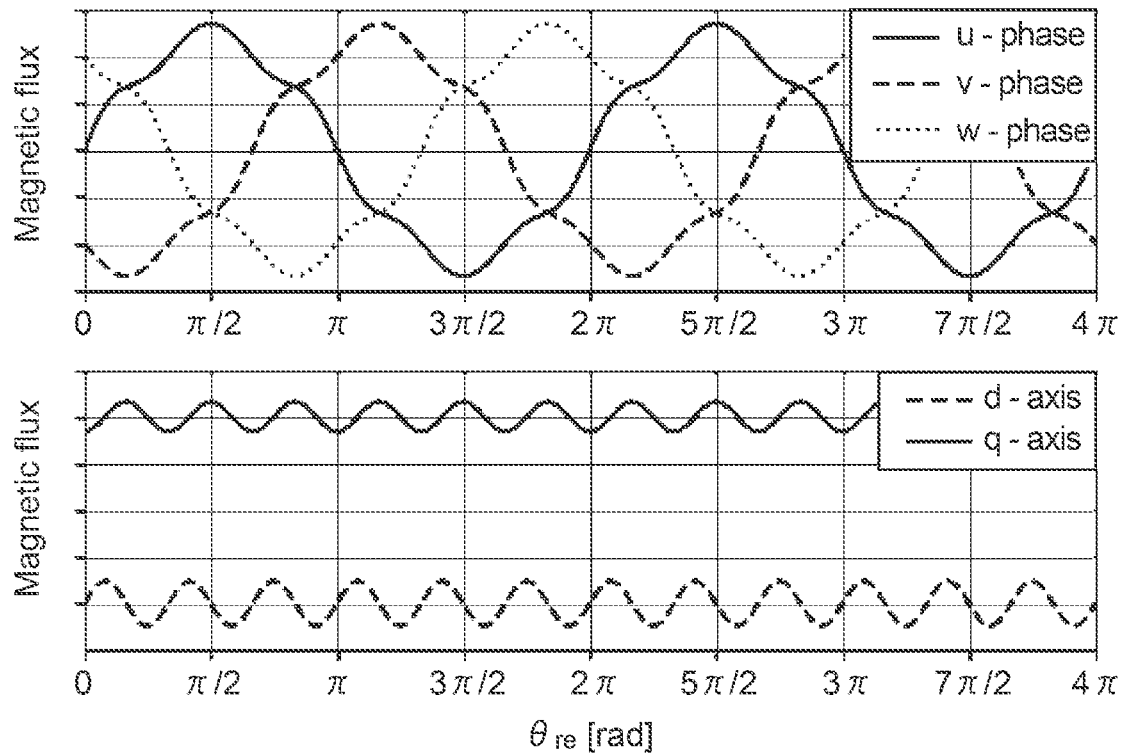
FIG. 2 is a diagram illustrating a rotor magnetic flux waveform of a motor in FIG. 1.
FIG. 3 is a diagram illustrating an embodiment of driving conditions of FIG. 1.

Since the spatial harmonic of the magnetic flux is a function of the electrical angle, the motor torque becomes a function of the current and the electrical angle. The magnetic flux waveform of a rotor magnetic flux is shown in FIG. 2. A solid line in the upper column of FIG. 2 indicates the magnetic flux waveform of a U phase, a thick broken line indicates the magnetic flux waveform of a V phase, and a thin broken line indicates the magnetic flux waveform of a W phase. A broken line in the lower column indicates a d-axis magnetic flux waveform, and a solid line in the lower column indicates a q-axis magnetic flux waveform.

The rotor magnetic flux including the spatial harmonics does not excite even-order harmonics due to the point symmetry of the waveform. Further, since the harmonic component of the 3nth order does not exist in a three-phase connection, the harmonic component of the rotor magnetic flux becomes a 6n plus/minus 1st order component. Experimentally, it is known that the motor (IPMSM) 6 has a 6 plus/minus 1st order harmonic component and a 12 plus/minus 1st order harmonic component as main components. When coordinate conversion is applied to the dq axis, the 6 plus/minus 1st order becomes the 6th order, and the 12 plus/minus 1st order becomes the 12th order.

Therefore, the feed forward command value calculation unit 23 of the embodiment calculates and outputs the 6th order q-axis voltage feed forward command value $V_{qff}^*$, which becomes the main component of the torque ripple, as will be described later. Here, from the above equations (1) and (2), it can be seen that the frequency of the torque ripple depends on the electrical angle and the amplitude thereof depends on the current. When compensating for the torque ripple by current control, the current control band is required to be set as a band which can sufficiently follow the frequency of the electrical angle 6th order, but it is difficult to raise the current control band because the position sensorless vector control includes phase estimation.

In order to solve this problem, the feed forward command value calculation unit 23 calculates a voltage command value which cancels the torque ripple due to the spatial harmonics, and directly outputs the voltage command value to perform torque ripple compensation at the time of the position sensorless vector control. In this case, the feed forward command value calculation unit 23 of the embodiment calculates the a-axis voltage feed forward command value $V_{qff}^*$ using the equation (3). Then, the q-axis voltage feed forward command value $V_{qff}^*$ is subtracted from the q-axis voltage command value $V_q^{ref}$ by the subtraction unit 10. This is the q-axis voltage feed forward control.

[Math. 5]

$$V_{qff}^* = \frac{i_q^{\wedge} k_{6hq}\left(6\theta_{re}^{\wedge} + \tan^{-1}\frac{6\omega_{re}L_q}{R}\right)}{\phi_f}\sqrt{R^2 + (6\omega_{re}L_q)^2} \quad (3)$$

where $i_q$ (hat) is a q-axis current estimated value, $K_{6hq}$ is a q-axis 6th order harmonic magnetic flux, $\theta_{re}$ (hat) is an electrical angle estimated value, $\phi_f$ is the amplitude of an armature interlinkage magnetic flux 1st order component, R is a winding resistance, $L_q$ is a q-axis winding inductance, and $\omega_{re}$ is an electric angular velocity.

That is, from the above equation (3), it can be seen that the q-axis voltage feed forward command value $V_{qff}^*$ is calculated based on the parameters of the spatial harmonics and the frequency characteristics of the motor winding. Then, the q-axis voltage feed forward command value $V_{qff}^*$ is a value which generates a 6th-order q-axis current ripple.

When compensating for the torque ripple by current control, the torque is a function of the current, and hence the phase of the torque ripple and the phase of the ripple superimposed on the current are in phase. On the other hand, when compensating for the torque ripple in the voltage dimension, a stator winding is equivalent to an LR circuit, so that the motor current has a phase lag with respect to the voltage applied to the motor and has attenuation characteristics with respect to the harmonics.

Therefore, in the compensation in the voltage dimension as in the present invention, it is necessary to consider the phase delay and the attenuation of the amplitude in the LR circuit. In a first-order lag circuit of LR, since the current has a phase lag with respect to the voltage, the spatial harmonic value obtained by advancing the phase based on the impedance of the motor 6 with respect to the electrical angle estimated value of the spatial harmonic of the equation (2) is used for the q-axis voltage feed forward control. $K_{6hq}$ in the equation (3) and the term in parentheses following it corresponds to this spatial harmonic value, and the term of $\tan^{-1}$ corresponds to the phase advanced based on the impedance of the motor 6. Here, since the $\tan^{-1}$ term can be approximated to $\pi/2$ in a medium and high speed range, the $\tan^{-1}$ term in the equation (3) is considered to be $\pi/2$ in the embodiment.

Further, the frequency of the electrical angle 6th order changes depending on the driving conditions of the motor 6. Then, since an attenuation coefficient differs depending on the frequency, it is necessary to change the amplitude of the a-axis voltage feed forward command value $V_{qff}^*$ for each frequency. In the embodiment, since the stator is equivalent to the LR circuit, the gain characteristic of the first-order lag system of LR is taken into consideration, and the gain based on the impedance of the motor 6 is multiplied. The term of the square root in the equation (3) corresponds to this gain, and the amplitude is amplified by the attenuating amplitude.

The significance of the q-axis voltage feed forward command value $V_{qff}^*$ described above will be described in detail below using mathematical equations. In the above equation (3), the q-axis 6th order harmonic magnetic flux $k_{6hq}$ is a function of the electrical angle $\theta_{re}$. Since the d-axis current constantly performs control at OA in the above equation (1), the d-axis current and the torque ripple due to the magnetic flux harmonic are not considered. Further, since the magnetic flux harmonic is composed mainly of a component of electrical angle 6th order, the equation (1) becomes as shown in the following equation (3A) when a 12th order component is ignored.

[Math. 6]

$$T_m = P\phi_f i_q + P i_q k_{6hq}(6\theta_{re}) \tag{3A}$$

Here, assuming that the motor torque which does not include ripples is $T_{mDC}$, and the ripple component of the motor torque is $T_{mrip}$, they can be expressed by the following equation (3B).

[Math. 7]

$$T_{mDC} + T_{mrip} = P\phi_f i_q + P i_q k_{6hq}(6\theta_{re}) \tag{3B}$$

Considering that a q-axis current component $i_{qrip}$ which controls the torque ripple to of the equation (3B) to be 0, is subtracted from $i_q$, the equation (3B) becomes as shown in the following equation (3C).

[Math. 8]

$$T_m = T_{mDC} + T_{mrip} = P\phi_f(i_q - i_{qrip}*) + P(i_q - i_{qrip}*) k_{6hq}(6\theta_{re})$$

$$T_{mDC} + T_{mrip} = P\phi_f i_q - P\phi_f i_{qrip}* + P i_q k_{6hq}(6\theta_{re}) - P i_{qrip}* k_{6hq}(6\theta_{re})$$

$$T_{mDC} + T_{mrip} - P\phi_f i_q - P i_q k_{6hq}(6\theta_{re}) = -P(\phi_f + k_{6hq}(6\theta_{re})) i_{qrip}* \tag{3C}$$

Here, since the motor torque $T_{mDC}$ excluding ripples is controlled by $P\phi_f i_q$, it is assumed that the two terms are equal. Further, in order to make the torque ripple 0, when $T_{mrip} = 0$, $i_{qrip}*$ becomes as shown in the following equation (3D).

[Math. 9]

$$i_{qrip}* = \frac{i_q k_{6hq}(6\theta_{re})}{\phi_f + k_{6hq}(6\theta_{re})} \tag{3D}$$

Here, since $\phi_f = k_{6hq}(6\theta_{re})$, the equation (3D) can be as shown in the following equation (3E).

[Math. 10]

$$i_{qrip}* = \frac{i_q k_{6hq}(6\theta_{re})}{\phi_f} \tag{3E}$$

Subtracting the equation (3E) from the q-axis current command value enables the torque ripple of the electrical angle 6th order caused by the spatial harmonics to be suppressed. However, when it is given by the q-axis current command, a high-speed current controller which follows the frequency of the torque ripple is required. In the position sensorless vector control system, the band of the current controller is limited, so that it is difficult to construct the high-speed current controller. Therefore, there is a need to convert $i_{qrip}*$ into a voltage command value in order to suppress the torque ripple in the voltage dimension.

In this case, since the motor winding is represented by an LR circuit, the voltage and current have phase characteristics and gain characteristics for each frequency. In order to compensate in the voltage dimension, there is a need to calculate a voltage compensation value in consideration of the phase characteristics and gain characteristics of the motor winding. The phase characteristics of the motor winding are shown in the following equation (3F).

[Math. 11]

$$\angle G_{LR}(j\omega) = -\tan^{-1}\frac{L_q \omega}{R} \tag{3F}$$

The gain characteristics of the motor winding are shown in the following equation (3G).

[Math. 12]

$$|G_{LR}(j\omega)| = \frac{1}{\sqrt{R^2 + (\omega L_q)^2}} \tag{3G}$$

It is possible to obtain the q-axis voltage feed forward command value $V_{qff}*$ responding to a desired current by in consideration of the above equations (3F) and (3G) performing advanced phase compensation by a phase delay and amplifying the amplitude by attenuated amplitude. The q-axis voltage feed forward command value $V_{qff}*$ is shown in the following equation (3H).

[Math. 13]

$$V_{qff}* = \frac{i_{qrip}*(6\theta_{re} - \angle G_{LR}(6\omega_{re}))}{|G_{LR}(6\omega_{re})|}$$

$$= \frac{i_q \wedge k_{6hq}\left(6\theta_{re} + \tan^{-1}\frac{6\omega_{re} L_q}{R}\right)}{\phi_f} \sqrt{R^2 + (6\omega_{re} L_q)^2} \tag{3H}$$

When applying the equation (3H) with the position sensorless vector control, the q-axis current and the electrical angle become estimated values. Further, as to the electrical angular velocity, it is also possible to use the velocity command value instead of the estimated value when the speed controller operates stably and is in a steady state. Therefore, the equation (3H) becomes the above equation (3).

Further, in the medium and high speed range, the terms of $\tan^{-1}$ and the square root in the equation (3) can also be approximated to $\pi/2$ and $6\omega_{re} L_q$, respectively, so that the equation (3) can also be expressed in the following equation (3I).

[Math. 14]

$$V_{qff}* = \frac{i_q \wedge k_{6hq}\left(6\theta_{re} \wedge +\frac{\pi}{2}\right)}{\phi_f} 6\omega_{re} L_q \tag{3I}$$

The q-axis voltage feed forward command value $V_{qff}*$ calculated by the feed forward command value calculation unit 23 in this way is subtracted from the q-axis voltage command value $V_q^{ref}$ in the subtraction unit 10 as described above, which is output as the compensated q-axis voltage command value $V_q*$. Consequently, the torque ripple having the opposite phase to the torque ripple of the electrical angle 6th order caused by the spatial harmonics is output as the magnet torque, and hence the torque ripple is canceled.

(4-2) d-Axis Voltage Feed Forward Control

On the other hand, the motor (IPMSM) 6 has a phenomenon called a velocity electromotive force which couples with each other between the dq axes, and the current flowing in each axis appears as a disturbance component in the other axis. The decoupling controller 14 of FIG. 1 performs decoupling control in which a voltage command value is added in advance so as to cancel the coupling voltage component as described above in order to independently control the current of each axis. However, when a feed forward voltage is applied to the q-axis voltage by the q-axis voltage feed forward control as mentioned above to generate a q-axis current ripple, the ripple of the q-axis current couples with the d-axis to excite the ripple to the d-axis current and excite the ripple to the reluctance torque.

In order to suppress or eliminate this, the feed forward command value calculation unit 23 of the embodiment performs the d-axis voltage feed forward control described below, and calculates and outputs a d-axis voltage feed forward command value $V_{dff}^*$, and the addition unit 11 adds the d-axis voltage feed forward command value $V_{dff}^*$ to the d-axis voltage command value $V_d^{ref}$. Here, since the q-axis current ripple couples with the d-axis in the voltage dimension, the phase of the d-axis current ripple generated by the q-axis current ripple is delayed by $\pi/2$ with respect to the q-axis current. Therefore, the phase of the d-axis voltage feed forward command value $V_{dff}^*$ is in phase with the ripple phase of the q-axis current.

The feed forward command value calculation unit 23 of the embodiment calculates the d-axis voltage feed forward command value $V_{dff}^*$ using an equation (4).

[Math. 15]

$$V_{dff}\ {*}=\frac{i_q{}^\wedge k_{6hq}(6\theta_{re}{}^\wedge)}{\phi_f}L_q\omega_{re} \qquad (4)$$

where $i_q$ (hat) is a q-axis current estimated value, $k_6 a$ is a q-axis 6th order harmonic magnetic flux, $\theta_{re}$ (hat) is an electrical angle estimated value, $\phi_f$ is the amplitude of an armature interlinkage magnetic flux 1st order component, $L_q$ is a q-axis winding inductance, and $\omega_{re}$ is an electric angular velocity. In the sensorless vector control, the q-axis current and the electrical angle become estimated values. As to the electric angular velocity, when the velocity control operates stably and is in a steady state, it is also possible to use the velocity command value instead of the estimated value.

That is, it can be seen from the above equation (4) that the d-axis voltage feed forward command value $V_{dff}^*$ is a coupling term in which the q-axis current ripple generated by the q-axis voltage feed forward control couples with the d-axis, and is derived from the current superimposed on the q-axis current. Since the coupling term is the voltage dimension, it is not necessary to perform a process of advancing the phase as in the case of the q-axis voltage feed forward control.

The significance of the d-axis voltage feed forward command value $V_{dff}^*$ described above will be described in detail below using mathematical equations. When a constant ripple component is passed through the q-axis current according to the above equation (3), the ripple component appears as a coupling voltage on the d-axis due to the above-mentioned inter-axis coupling. The ripple component which appears as the coupling voltage excites the ripple to the d-axis current. This ripple component also appears in the reluctance torque. That is, the q-axis voltage feed forward control excites the unintended ripple as the reluctance torque.

In order to suppress the ripple of the reluctance torque, it is necessary to make the q-axis voltage feed forward command value $V_{qff}^*$ decoupling in the same manner as in the decoupling controller 14. The coupling voltage $E_d$ of the q-axis current with respect to the d-axis is represented by the following equation (4A).

[Math. 16]

$$E_d = -i_q L_q \omega_{re} \qquad (4A)$$

Since the q-axis voltage feed forward command value $V_{qff}^*$ in the equation (3) is subtracted from the q-axis voltage command value V and output as the compensated q-axis voltage command value $V_q^*$, the current flowing on the q-axis by the q-axis voltage feed forward control becomes the sign inversion of the equation (3E). Therefore, the coupling voltage $E_d$ is expressed by the following equation (4B).

[Math. 17]

$$E_d = -(-i_{qrip}*)L_q\omega_{re} = \qquad (4B)$$
$$i_{qrip}*L_q\omega_{re} = i_{qrip}*L_q\omega_{re} = \frac{i_q k_{6hq}(6\theta_{re})}{\phi_f}L_q\omega_{re}$$

By adding the coupling voltage component represented by the equation (4B) to the d-axis voltage command value $V_d^{ref}$ in advance and setting it as the compensated d-axis voltage command value $V_d^*$, the decoupling of the q-axis voltage feed forward control and the d-axis are performed. In the position sensorless vector control, the q-axis current and the electrical angle become estimated values. Further, as to the electric angular velocity, when the speed controller operates stably and is in a steady state, it is also possible to use the velocity command value instead of the estimated value, so that the equation (4B) becomes the equation (4).

In this way, the d-axis voltage feed forward command value $V_{dff}^*$ calculated by the feed forward command value calculation unit 23 is added to the d-axis voltage command value $V_d^{ref}$ by the addition unit 11 as described above to be output as the compensated d-axis voltage command value $V_d^*$. Consequently, the excitation of the reluctance torque due to the q-axis voltage feed forward control is suppressed or eliminated.

(4-3) Effects by q-Axis Voltage Feed Forward Control and d-Axis Voltage Feed Forward Control.

A simulation experiment was conducted to demonstrate the effects by the q-axis feed forward control and the d-axis feed forward control described above. The driving conditions in this case are shown in FIG. 3. When the revolution speed follows a command value of 3000 rpm, the mechanical angular frequency becomes 50 Hz, and the electric angular frequency becomes 200 Hz. At this time, the frequency of the torque ripple becomes 1200 Hz (7540 rad/s) of the electrical angle 6th order and becomes a frequency which cannot be controlled in the current control band shown in FIG. 3.

Figure 6:
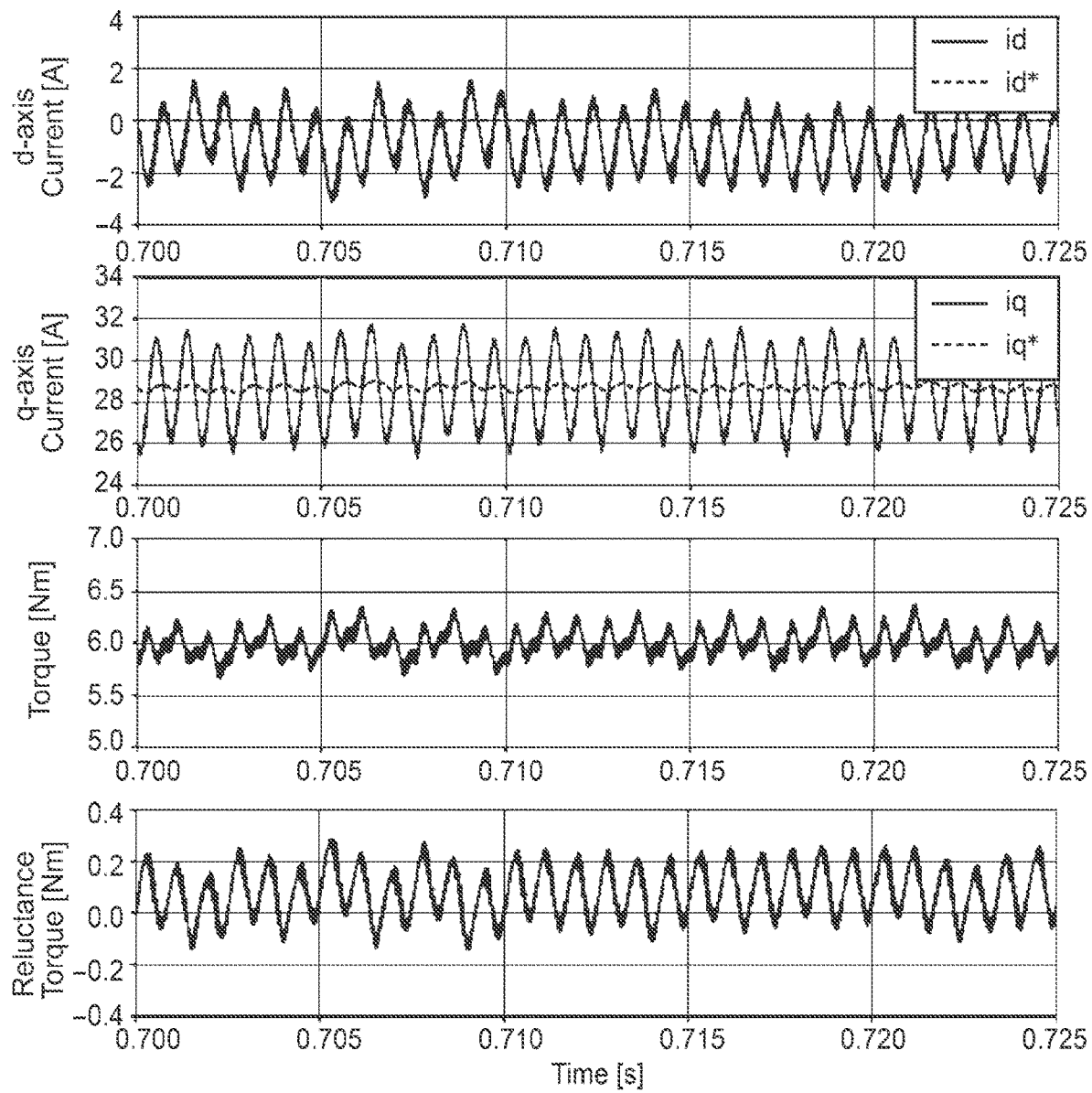
FIG. 6 is a diagram illustrating a dq-axis current, motor torque, and reluctance torque when d-axis voltage feed forward control in the embodiment is performed.
Figure 7:
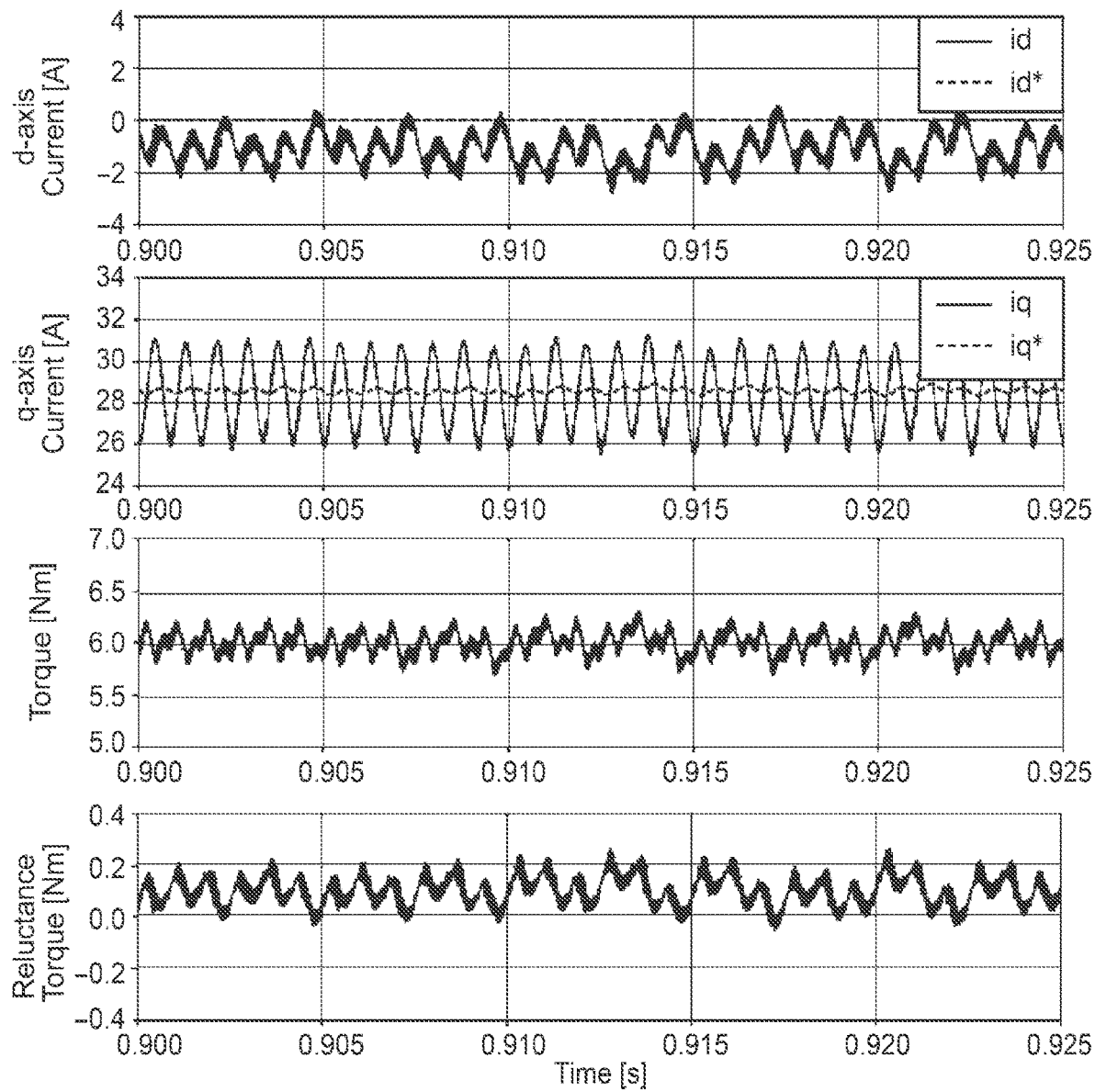
FIG. 7 is a diagram illustrating a dq-axis current, motor torque, and reluctance torque when q-axis voltage feed forward control and d-axis voltage feed forward control in the embodiment are performed.
Figures 8, 9:
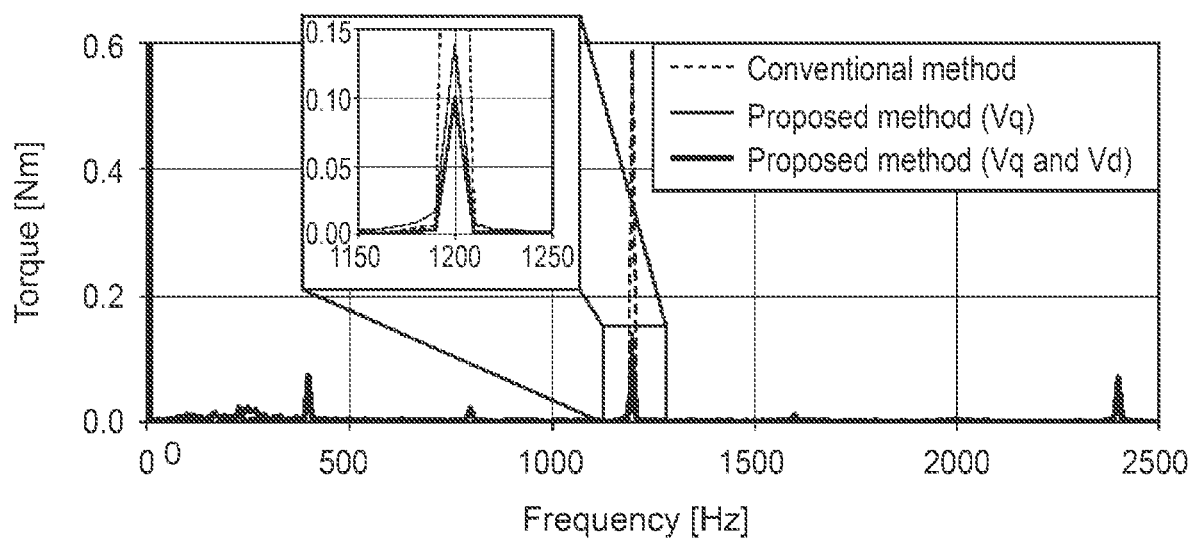
FIG. 8 is a diagram illustrating FFT analysis results of the motor torque in the case of FIG. 7.
FIG. 9 is a diagram comparing torque ripples in the case of FIGS. 5 to 7.

The simulation experiment results are shown in FIGS. 4 to 7, and the FFT analysis results of the motor torque in the conventional method and the present invention are shown in FIG. 8. Further, FIG. 9 shows the effect of improving torque ripples. The uppermost stage of FIG. 4 indicates the d-axis current command value $i_d^*$, the second stage from the top indicates the d-axis current $i_d$, the third stage from the top indicates the c-axis current command value $i_q^*$, the fourth stage from the top indicates the q-axis current $i_q$, and the lowermost stage indicates the output torque of the motor (at a revolution speed of 3000 rpm), respectively.

Figure 5:
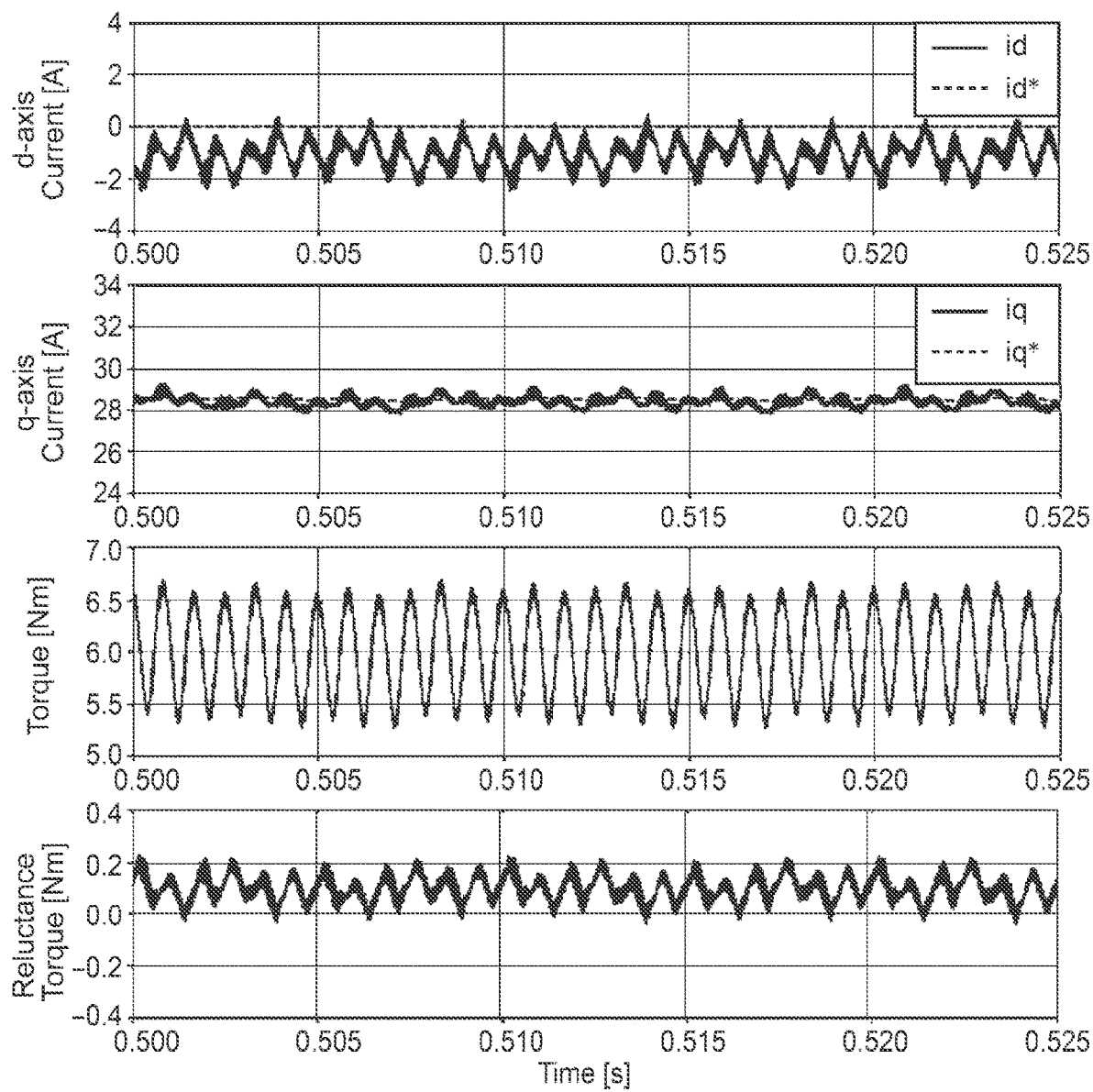
FIG. 5 is a diagram illustrating a dq-axis current, motor torque, and reluctance torque in the case of the conventional method which does not carry out the present invention.

FIG. 5 shows the results by the conventional method. The uppermost stage indicates the d-axis current command value $i_d^*$ and the d-axis current $i_d$, the second stage from the top indicates the q-axis current command value $i_q^*$ and the q-axis current $i_q$, the third stage from the top indicates the output torque of the motor, and the lowermost stage indicates the reluctance torque, respectively.

Also, FIG. 6 shows the results when only the q-axis voltage feed forward control is performed. Likewise, the uppermost stage indicates the d-axis current command value $i_d^*$ and the d-axis current $i_d$, the second stage from the top indicates the q-axis current command value $i_q^*$ and the q-axis current $i_q$, the third stage from the top indicates the output torque of the motor, and the lowermost stage indicates the reluctance torque, respectively.

Further, FIG. 7 shows the results when both the q-axis voltage feed forward control and the d-axis voltage feed forward control are performed. Similarly, the uppermost stage indicates the d-axis current command value $i_d^*$ and the d-axis current $i_d$, the second stage from the top indicates the q-axis current command values $i_q^*$ and the q-axis current $i_q$, the third stage from the top indicates the output torque of the motor, and the lowermost stage indicates the reluctance torque, respectively.

Further, a broken line in FIG. 8 indicates the motor torque according to the conventional method, a thin solid line indicates the motor torque only by the q-axis voltage feed forward control, and a thick solid line indicates the FFT analysis results of the motor torque when both the q-axis voltage feed forward control and the d-axis voltage feed forward control are performed, respectively.

Figure 4:
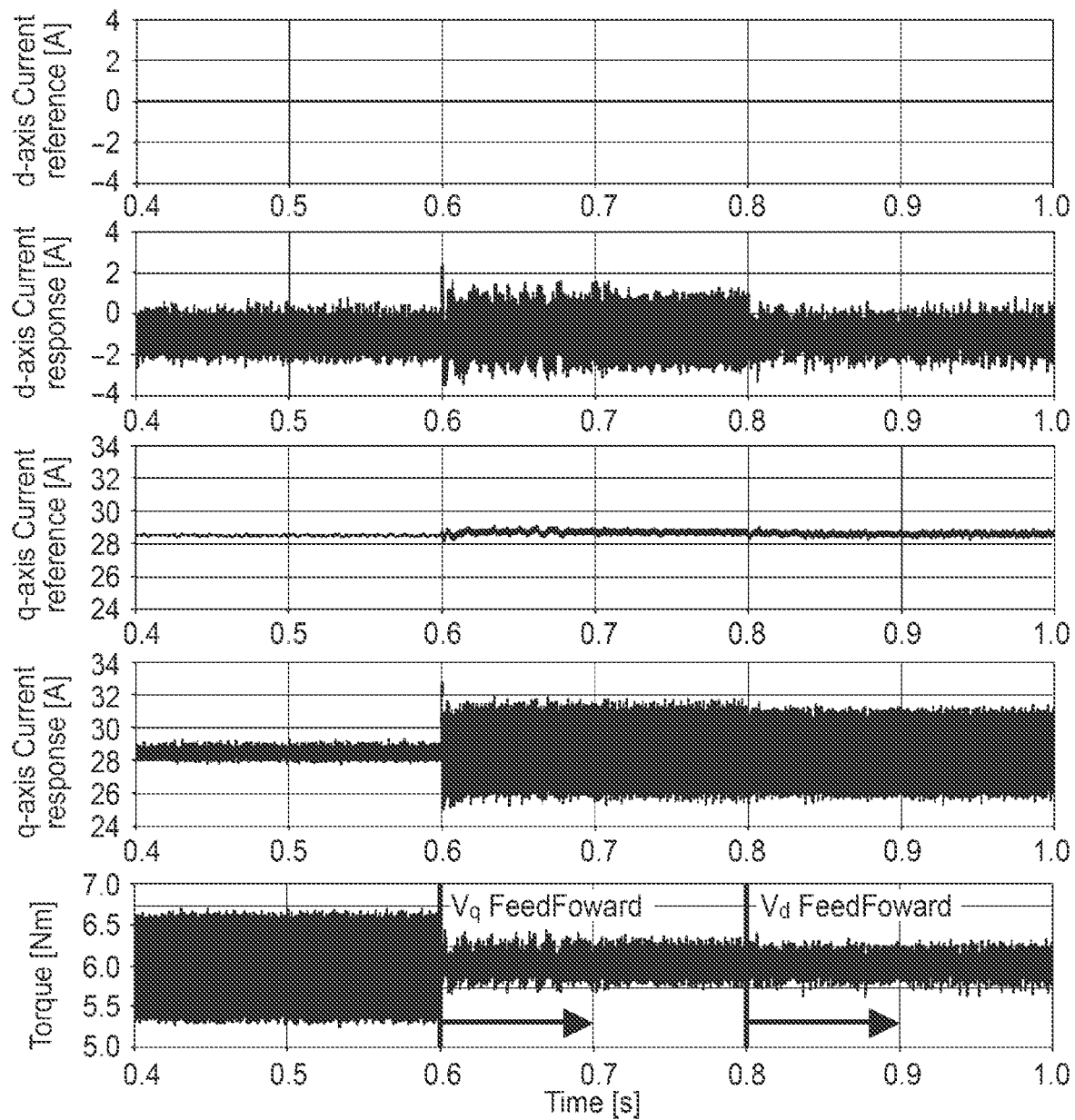
FIG. 4 is a diagram illustrating a dq-axis current and motor torque by the motor control device of the embodiment.

The q-axis voltage feed forward control (indicated by $V_q$FeedForward) was started from 0.6 s in FIG. 4, and the d-axis voltage feed forward control (indicates by $V_d$FeedForward) was started from 0.8 s. According to the experimental results, it was possible to confirm that the ripple of the motor output torque was reduced by 76.3% by passing the ripple current of the electrical angle 6th order on the q-axis by the q-axis voltage feed forward control (FIG. 9).

On the other hand, by performing the q-axis voltage feed forward control, the ripple component made to flow on the q-axis appears in the d-axis coupling voltage, and the d-axis current ripple is excited. Since the phase of the d-axis current ripple is $\pi/2$ behind the phase of the qi-axis current ripple, the torque ripple excited as the reluctance torque is $\pi/2$ behind the phase of the magnet torque ripple, so that the torque ripple suppression effect by the q-axis voltage feed forward is reduced. In order to suppress the voltage coupling due to the q-axis voltage feed forward control, the d-axis voltage feed forward control was conducted so as to cancel the ripple component with respect to the d-axis voltage (from 0.8 s).

It was possible to confirm by experiments that the ripple component amplified by the q-axis voltage feed forward control was suppressed by this d-axis voltage feed forward control. Also, it was possible to confirm that the ripple of motor torque was also reduced due to the reduction in the ripple of the reluctance torque due to the axis coupling. Further, it was also possible to confirm that by performing the d-axis voltage feed forward control, the torque ripple of the electrical angle 6th order was reduced as compared with the case where only the q-axis voltage feed forward control was performed, and was reduced by 83.1% compared to the conventional method (FIG. 9). Incidentally, since the ripple component of the electrical angle 12th order (2400 Hz) is not subject to suppression control, there is no change due to the control.

As described in detail above, it became possible to suppress the vibrations of electromagnetic energy due to the spatial harmonics by implementing the q-axis voltage feed forward control and the d-axis voltage feed forward control applicable to the motor (IPMSM) driven by the position sensorless vector control. Therefore, it was possible to reduce electromagnetic noise and electromagnetic sound noise.

Incidentally, in the embodiment, the feed forward command value calculation unit 23 calculates the q-axis voltage feed forward command value $V_{qff}^*$ using the equation (3), and the subtraction unit 10 subtracts the same from the q-axis voltage command value $V_q^{ref}$. However, a means for setting the q-axis voltage feed forward command value $V_{qff}^*$ calculated by the equation (3) as the opposite phase is provided, or the feed forward command value calculation unit 23 sets the calculated value of the equation (3) as the opposite phase, and instead of the subtraction unit 10, an addition unit is provided to add the value made opposite in phase to the q-axis voltage command value $V_q^{ref}$, so that the q-axis voltage feed forward command value $V_{qff}^*$ may be subtracted from the q-axis voltage command value $V_q^{ref}$.

In that case, the means to make the phase opposite and the addition unit, or a part of the functions of the feed forward command value calculation unit 23 and the addition unit constitute the subtraction unit in the present invention. It is needless to say that the same applies even to the relationship between the feed forward command value calculation unit 23 and the addition unit 11 regarding the control of adding the d-axis voltage feed forward command value $V_{dff}^*$ to the d-axis voltage command value $V_d^{ref}$ (instead of the addition unit 11, a means for setting the d-axis voltage feed forward command value $V_{dff}^*$ to the opposite phase and a subtraction unit are provided).

Further, in the embodiment, the q-axis voltage feed forward control and the d-axis voltage feed forward control are performed for the spatial harmonics of the electrical angle 6th order, but the present invention is not limited to this (inventions other than the inventions of claims 5 and 7). Alternatively, in addition to this, they may be performed on spatial harmonics of multiples of 6 such as spatial harmonics of the electrical angle 12th order. Even better effects can be expected when implemented for multiple spatial harmonics.

DESCRIPTION OF REFERENCE NUMERALS 1 motor control device
2 inverter circuit
3 control section
4 DC power supply
6 motor (IPMSM)
10 subtraction unit
11 addition unit
15 voltage command calculation unit
16 phase voltage command calculation unit
17 PWM signal generator
23 feed forward command value calculation unit

The invention claimed is:
1. A motor control device compensating for a torque ripple caused by spatial harmonics, comprising:
a voltage command calculation unit to calculate a d-axis voltage command value $V_d^{ref}$ and a q-axis voltage command value $V_q^{ref}$ from a d-axis current command value $i_d^*$ and a q-axis current command value $i_q^*$ of a motor;

a feed forward command value calculation unit to calculate a q-axis voltage feed forward command value $V_{qff}^*$ for generating a q-axis current ripple on the basis of spatial harmonic parameters and the frequency characteristics of a motor winding; and a subtraction unit to subtract the q-axis voltage feed forward command value $V_{qff}^*$ calculated by the feed forward command value calculation unit from the q-axis voltage command value $V_q^{ref}$ calculated by the voltage command calculation unit.

2. The motor control device according to claim 1, wherein the motor is a three-phase permanent magnet synchronous motor, and wherein the feed forward command value calculation unit calculates the q-axis voltage feed forward command value $V_{qff}^*$ of electrical angle 6nth order (n is a positive integer).

3. The motor control device according to claim 2, wherein the feed forward command value calculation unit calculates the q-axis voltage feed forward command value $V_{qff}^*$ from a spatial harmonic value obtained by advancing the phase based on the impedance of the motor with respect to an electrical angle estimated value.

4. The motor control device according to claim 2, wherein the feed forward command value calculation unit calculates the q-axis voltage feed forward command value $V_{qff}^*$ from a spatial harmonic value obtained by advancing the phase based on the impedance of the motor with respect to an electrical angle estimated value.

5. The motor control device according claim 1, wherein the feed forward command value calculation unit calculates the q-axis voltage feed forward command value $V_{qff}^*$ by multiplying the spatial harmonic by a gain based on the impedance of the motor.

6. The motor control device according to claim 1, wherein the motor is a three-phase permanent magnet synchronous motor, wherein when a q-axis current estimated value of the motor is $i_q$ (hat), a q-axis 6th order harmonic magnetic flux is $k_{6hq}$, an electrical angle estimated value is $\theta_{re}$ (hat), the amplitude of an armature interlinkage magnetic flux 1st order component is $\phi_f$, a wiring resistance is R, a q-axis winding inductance is $L_q$, and an electric angular velocity is cow, the q-axis voltage feed forward command value $V_{qff}^*$ is given as follows:

[Math. 18]

$$V_{qff} *= \frac{i_q{}^\wedge k_{6hq}\left(6\theta_{re}{}^\wedge + \tan^{-1}\frac{6\omega_{re}L_q}{R}\right)}{\phi_f}\sqrt{R^2 + (6\omega_{re}L_q)^2}, \quad (3)$$

and wherein the feed forward command value calculation unit calculates the q-axis voltage feed forward command value $V_{qff}^*$ of the electrical angle 6th order by using the above equation (3).

7. The motor control device according to claim 1, wherein the feed forward command value calculation unit further calculates a d-axis voltage feed forward command value $V_{dff}^*$ which is a coupling term in which the q-axis current ripple generated by the q-axis voltage feed forward command value $V_{qff}^*$ couples with the d-axis, and wherein the motor control device further includes an addition unit to add the d-axis voltage feed forward command value $V_{dff}^*$ calculated by the feed forward command value calculation unit to the d-axis voltage command value $V_d^{ref}$ calculated by the voltage command calculation unit.

8. The motor control device according to claim 7, wherein the motor is a three-phase permanent magnet synchronous motor, wherein when a q-axis current estimated value of the motor is $i_q$ (hat), a q-axis 6th order harmonic magnetic flux is $k_{6hq}$, an electrical angle estimated value is $\theta_{re}$ (hat), the amplitude of an armature interlinkage magnetic flux 1st order component is $\phi_f$, a q-axis winding inductance is $L_q$, and an electric angular velocity is $\omega_{re}$, the d-axis voltage feed forward command value $V_{dff}^*$ is given as follows:

[Math. 19]

$$V_{dff} *= \frac{i_q{}^\wedge k_{6hq}(6\theta_{re}{}^\wedge)}{\phi_f}L_q\omega_{re}, \quad (4)$$

and wherein the feed forward command value calculation unit calculates the d-axis voltage feed forward command value $V_{dff}^*$ of the electrical angle 6th order by using the above equation (4).

9. The motor control device according to claim 8, wherein the motor is a three-phase permanent magnet synchronous motor, and wherein the motor control device includes:

an inverter circuit to drive the motor, a phase voltage command calculation unit to convert a q-axis voltage command value $V_q^*$ after the q-axis voltage feed forward command value $V_{qff}^*$ is subtracted from the q-axis voltage command value $V_q^{ref}$, and a d-axis voltage command value $V_d^*$ after the d-axis voltage feed forward command value $V_{dff}^*$ is added to the d-axis voltage command value $V_d^{ref}$ into a three-phase modulated voltage command value, and a PWM signal generator to generate a PWM signal to PWM-control the inverter circuit on the basis of the three-phase modulated voltage command value.

10. The motor control device according to claim 7, wherein the motor is a three-phase permanent magnet synchronous motor, and wherein the motor control device includes:

an inverter circuit to drive the motor, a phase voltage command calculation unit to convert a q-axis voltage command value $V_q^*$ after the q-axis voltage feed forward command value $V_{qff}^*$ is subtracted from the q-axis voltage command value $V_q^{ref}$, and a d-axis voltage command value $V_d^*$ after the d-axis voltage feed forward command value $V_{dff}^*$ is added to the d-axis voltage command value $V_d^{ref}$ into a three-phase modulated voltage command value, and a PWM signal generator to generate a PWM signal to PWM-control the inverter circuit on the basis of the three-phase modulated voltage command value.

* * * * *